(12) United States Patent
Staphanos et al.

(10) Patent No.: US 6,983,640 B1
(45) Date of Patent: Jan. 10, 2006

(54) GENERATOR MONITORING, CONTROL AND EFFICIENCY

(75) Inventors: Stephen T. Staphanos, Long Beach, CA (US); Marion A. Keyes, St. Louis, MO (US); Gary G. Cacciatore, Santa Ana, CA (US)

(73) Assignee: Rosemount Analytical Inc., Anaheim, CA (US)

( * ) Notice: Subject to any disclaimer, the term of this patent is extended or adjusted under 35 U.S.C. 154(b) by 93 days.

(21) Appl. No.: 10/624,300

(22) Filed: Jul. 22, 2003

Related U.S. Application Data

(62) Division of application No. 10/079,054, filed on Feb. 18, 2002.
(60) Provisional application No. 60/269,921, filed on Feb. 19, 2001, provisional application No. 60/270,429, filed on Feb. 21, 2001, provisional application No. 60/272,924, filed on Mar. 2, 2001, provisional application No. 60/276,158, filed on Mar. 15, 2001, and provisional application No. 60/299,291, filed on Jun. 19, 2001.

(51) Int. Cl.
*G01N 7/00* (2006.01)

(52) U.S. Cl. .................. 73/23.31; 73/23.2; 73/23.32
(58) Field of Classification Search .............. 73/73, 73/23.2, 23.32, 23.31
See application file for complete search history.

(56) References Cited

U.S. PATENT DOCUMENTS

| | | | |
|---|---|---|---|
| 3,593,023 A | * | 7/1971 | Dodson et al. .............. 250/430 |
| 4,191,541 A | * | 3/1980 | Jenkins .................... 73/863.12 |
| 4,330,084 A | | 5/1982 | Buchner et al. ............ 237/12.1 |
| 4,336,772 A | * | 6/1982 | Young et al. .............. 123/25 L |
| 4,413,670 A | | 11/1983 | Ritter ............................ 165/1 |
| 4,419,667 A | | 12/1983 | Gurr et al. ............. 340/825.06 |
| 4,494,380 A | | 1/1985 | Cross ............................... 62/3 |
| 4,578,986 A | * | 4/1986 | Navarre ..................... 73/61.59 |

(Continued)

FOREIGN PATENT DOCUMENTS

| | | |
|---|---|---|
| DE | 43 22 923 A1 | 1/1995 |
| DE | 196 30 092 | 1/1998 |
| EP | 0 297 718 | 5/1988 |
| EP | 0 698 522 | 8/1995 |
| GB | 1 534 288 | 11/1978 |
| GB | 2278519 | 11/1994 |
| JP | 60-224959 | 11/1985 |
| JP | 08-210171 | 8/1996 |

OTHER PUBLICATIONS

Leyden et al., "Real–Time Analysis of Nox Emissions Using Expert Systems," Adv Instrum Control Int Conf Exhib, vol. 48, No. 2, 1993, pp. 1443–1453.

Copy of Examination Report in related foreign application.

Swanekamp, Robert, "Powerplant Automation," *Power*, Feb. 1995.

*Primary Examiner*—Hezron Williams
*Assistant Examiner*—Rodney Frank
(74) *Attorney, Agent, or Firm*—Westman, Champlin & Kelly, P.A.

(57) ABSTRACT

A system for generating electricity includes a generator and an interface. The generator is coupled to the interface and provides data to the interface regarding electricity generation. The interface is coupled to a control node for monitoring and controlling the generator. The control node may be coupled to the generator through a medium such as the internet. In some aspects of the invention, a continuous emissions monitoring system is provided for fossil-fuel based generators to enhance operation and reduce emissions of such generators.

4 Claims, 7 Drawing Sheets

U.S. PATENT DOCUMENTS

| | | | |
|---|---|---|---|
| 4,738,147 A | 4/1988 | Tomlin | 3/864.81 |
| 4,883,505 A * | 11/1989 | Lucero | 95/154 |
| 5,205,177 A | 4/1993 | DuBrock, Jr. et al. | 73/863.12 |
| 5,497,630 A | 3/1996 | Stein et al. | 62/112 |
| 5,539,638 A | 7/1996 | Keeler et al. | 364/424.03 |
| 5,661,463 A | 8/1997 | Letchak et al. | 340/636 |
| 5,734,255 A | 3/1998 | Thompson et al. | 322/7 |
| 5,754,033 A | 5/1998 | Thomson | 322/45 |
| 5,778,675 A | 7/1998 | Nakhamkin | 60/652 |
| 5,798,633 A | 8/1998 | Larsen et al. | 323/207 |
| 5,970,426 A | 10/1999 | Mandel et al. | 702/32 |
| 6,095,793 A | 8/2000 | Greeb | 431/12 |
| 6,118,680 A | 9/2000 | Wallace et al. | 363/71 |
| 6,148,659 A | 11/2000 | Traina | 73/25.01 |
| 6,150,955 A | 11/2000 | Tracy et al. | 340/870.02 |
| 6,155,212 A | 12/2000 | McAlister | 123/3 |
| 6,173,567 B1 | 1/2001 | Poola et al. | 60/724 |
| 6,234,390 B1 | 5/2001 | Rabe | 235/384 |
| 6,351,692 B1 | 2/2002 | Eaton et al. | 700/287 |
| 6,362,540 B1 | 3/2002 | Hill | 307/52 |
| 6,384,903 B1 | 5/2002 | Fuller | 356/4.01 |
| 6,553,336 B1 | 4/2003 | Johnson et al. | 702/188 |
| 2002/0035497 A1 | 3/2002 | Mazereeuw et al. | 705/7 |
| 2002/0168302 A1 | 11/2002 | Pahlman et al. | 422/171 |
| 2003/0098671 A1 | 5/2003 | Hochgraf | 322/36 |

* cited by examiner

GENERATOR MONITORING, CONTROL AND EFFICIENCY

CROSS REFERENCE TO RELATED APPLICATIONS

This is a Divisional of application Ser. No. 10/079,054, filed Feb. 18, 2002 the benefit of earlier-filed co-pending provisional applications: 60/269,921 entitled CONTINUOUS EMISSIONS MONITORING SYSTEM FOR DIESEL GENERATORS, filed Feb. 19, 2001; 60/270,429 entitled WEB-BASED MICRO POWERPLANT MONITOR AND CONTROL, filed Feb. 21, 2001; 60/272,924 entitled WEB-BASED MICRO POWERPLANT MONITOR AND CONTROL, filed Mar. 2, 2001; 60/276,158 entitled CENTRALIZED DISPATCH SYSTEM FOR BACK-UP POWER SYSTEM, filed Mar. 15, 2001; and 60/229,291 entitled POWER GENERATING MONITORING, CONTROL AND EFFICIENCY, filed Jun. 19, 2001. All of the above applications are fully incorporated herein by reference.

BACKGROUND OF THE INVENTION

The present invention relates to monitoring and control of small-scale power generators.

Worldwide, the demand for energy continues to increase while the supply of energy, such as electricity, is not always able to keep up with the increased demand. For instance, recently the west coast of the United States has been gripped by an energy crisis as the demand for energy, and more specifically electricity, has increased faster than improvements in infrastructure and capacity. The result of this was most pronounced in California where electricity producing plants have been running at virtually maximum capacity in order to provide electricity to the residents and industry of California. Even running at capacity, there have been rolling brown-outs where entire grids are provided with reduced power for a period of time. In order to remedy this problem, additional electrical power generating plants are required. However, the construction of such a large-scale electrical generating facility takes years to complete and is a very costly process. Thus, there is currently a dire need in many places, such as the west coast of the United States of America, to reduce energy consumption and to increase electrical capacity.

It is somewhat surprising to learn that even while the power plants operating in the western regions of the United States are running at virtually maximum capacity, they have back-up and peak generators that sit idle. These idled generators are used to provide additional electricity during peak demand. Many of these generators cannot be run fulltime because they are powered by fossil fuel engines such as reciprocating diesel engines, reciprocating gas engines, and gas turbines which generally produce relatively large emissions, especially if operated at less than optimal conditions The United States Environmental Protection Agency (EPA) has promulgated rules such as 40. CFR 60, part 75, that prescribe the maximum emissions that such fossil fuel-based generators can produce. The result of this is that while many parts of the western United States wrestle with dire electrical capacity and demand, thousands of back-up and peak generators in that very region sit idle.

Many large facilities also have their own back-up generators to provide back-up electricity for mission critical processes if their own supply of electricity is interrupted. Examples of such facilities include large corporations, hospitals, water and waste treatment facilities, shopping centers, prisons, universities, and any other facilities where the unit cost of electricity prohibits operation during non-emergency situations. Thus, in such situations, these generators also sit idle. As used herein, generator includes any system that converts any form of energy into electrical energy.

Another group of under-utilized generators can be found at facilities such as fast food restaurants, hotels, and other miscellaneous buildings. Such power systems are not used for back-up but generally run continuously or when the business is operating. However, such generators are typically oversized and their demanded internal use is periodic (higher when temperature is either higher or lower due to heating or air conditioned needs, higher when more people are in the building, and generally not used when the facility is closed). On average, these resources are operated at less than approximately 50 percent capacity. Large-scale deployment of such generators is significantly limited by the lack of a cost-effective Continuous Emission Monitoring System (CEMS) solution and the economics of having to buy a system that is often twice as large as what is required.

There are a number of technical hurdles that must be surmounted before large-scale implementation of available generators can occur. A first issue relates to emissions from fossil fuel burning generators. As described above, current continuous operation of such fossil fuel burning generators is limited due to the lack of a suitable emissions monitoring system. Another challenge that must be surmounted is the large-scale monitoring, control and maintenance of such generators. Further, it is important to improve energy efficiency as much as possible in order to extract as much usable energy as possible from a given source.

With respect to the emissions of fossil fuel based generators, it has been long known that fossil fuel engines such as diesel engines, also known as compression ignition engines, have high exhaust emissions. Emissions include carbon soot, carbon dioxide, volatile organic compounds, hydrocarbons and oxides of nitrogen.

The United States EPA is particularly concerned with emissions of diesel engines and numerous efforts are currently underway to reduce the emissions of such engines. See, for example, U.S. Pat. No. 6,173,567 to Poola et al. Currently, all power generation plants are required to record emissions and allow the EPA to conduct an on-site audit. During the audit, the EPA reviews emission data and typically requests an emission monitor calibration in their presence. To record and demonstrate calibration on each generator is an administrative burden. The cost of outfitting, calibrating and demonstrating each generator is one constraint that has heretofore prohibited effective use of such generators.

Regardless of the methods in which fossil fuel engines are controlled, in order to reduce exhaust emissions therefrom, it is generally necessary to somehow monitor the exhaust emissions themselves to provide a closed-loop system. The EPA does allow diesel peak generators to operate for short periods of time without monitoring of emissions, however this constraint reduces capacity. In electrical power producing plants, Continuous Emission Monitoring Systems (CEMS) are used to continuously sample exhaust emissions and analyze them for constituent components.

Currently, the CEMS equipment used for electrical power producing plants is wholly unsuitable for relatively small-scale generators that sit idle or are underutilized. This is because such current CEMS equipment is extremely unwieldy, often weighing over 300 pounds and requiring special transportation and special handling. Further, typical CEMS sample handling systems require approximately 120 hours of assembly and can cost upwards of $16,000.00. These factors in comparison to the cost and number of individual diesel-electric generators renders current CEMS equipment, though technically feasible, wholly impractical for such smaller applications.

A continuous emission monitoring system for small-scale fossil fuel generator systems that could be easily mounted on such generators and installed for a cost that could be justified, would facilitate enhanced emissions monitoring and use of such electrical generators. Monitoring the operation of the generators would facilitate compliance with current United States Environmental Protection Agency Guidelines, thereby allowing such generators to operate full time if need be. One potential use would be to allow the tens of thousands of smaller scale generators to assist in transition times where large-scale electrical generation plants are under construction. Further, the various corporations employing such generators could produce electricity with such generators and sell their excess electricity back to the energy or utility companies for transmission to others. The advantages provided by these generators will only increase as technical advances are made to reduce the emissions of diesel engines and improve diesel fuels.

As discussed above, management and control of such generators also presents a challenge. Specifically, in order to effectively utilize the capacity provided by such generators, it is important to be able to manage such devices without having to manually monitor and adjust each and every generator during operation to comply with EPA regulations. It is also important to be able to monitor emissions from fossil-fuel based generators without being present at the generator's location, given that such generators may number in the thousands.

Further, the economics of large-scale implementation of such generators and controllers would be improved if the efficiency of such systems could be improved. For example, it would be beneficial if the waste heat flowing from the generator itself could be put to additional use.

SUMMARY OF THE INVENTION

An improved continuous emissions monitoring system is disclosed that has been adapted for use with the fossil fuel burning generators. The improved sample handling system for the continuous emissions monitoring emission monitoring system is much smaller than traditional sample handling systems while also significantly less expensive than such prior systems and can be set up in significantly less time that than that required for prior systems. These features will become apparent with reference to the various embodiments set forth below.

In another aspect of the invention, the generators are controlled through a centralized controller that provides control and reporting functions allowing cost reductions, associated with operation of such generators. In one embodiment, the dispatch, control, monitoring and optimization of such generators is done through communication means, such as the internet, an intranet, a virtual LAN, wireless communication, or any other suitable medium.

In yet another aspect of the invention, waste heat from the generator is recaptured and used to drive a metal hydride type heat pump system.

DETAILED DESCRIPTION OF THE PREFERRED EMBODIMENTS

The following description of the preferred embodiments is organized by function. However, the organization of the description should not be considered a limitation upon the invention, since various functions can be combined or omitted as desired.

Continuous Emission Monitoring System (CEMS)

Figure 1:
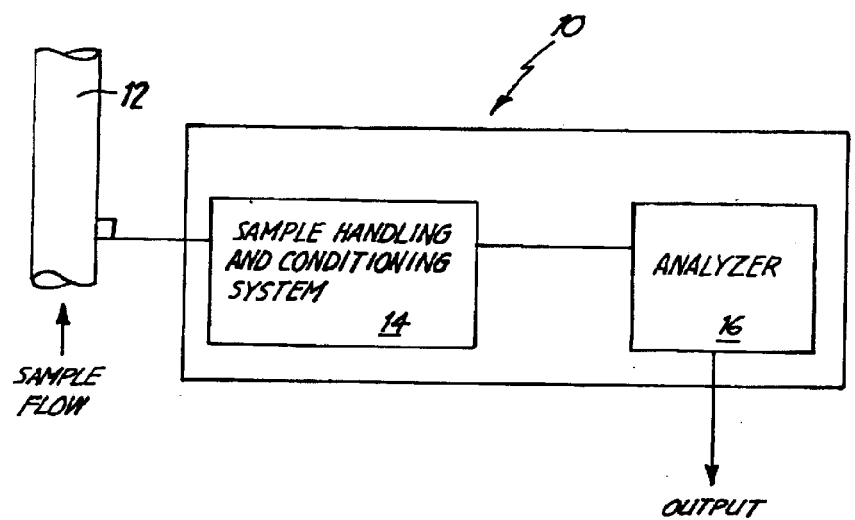
FIG. 1 is a diagrammatic view of a continuous emissions monitoring system.

FIG. 1 illustrates a Continuous Emission Monitoring System 10 coupled to a process container such as pipe 12. System 10 periodically, or continuously, extracts samples of exhaust gas from container 12 and analyzes such gases for constituent components. Based upon the analysis of such components, information can be obtained about the combustion process itself. Once this information is known, various parameters can be adjusted or modified in order to optimize the combustion process. Generally, a Continuous Emission Monitoring System, such as system 10, includes two main components; a sample handling system and a suitable analyzer.

Sample handling system 14 is coupled to an analyzer 16 and is used to extract a process sample from a sampling point on process container 12. Generally, a sample handling system includes all requisite components to maintain a constant sample flow to analyzer 16. Thus, the sample handling system generally includes suitable pressure reduction components, filters, vaporizes, flow controls, and sample switching or selector valves for introducing multiple sample streams or calibration standards to the process analyzer. Sample handling systems are an important component of effective emission monitoring systems because if the emission sample is not delivered to the analyzer in a condition that is representative of the combustion, errors will occur in the analysis. Many of the problems encountered in emission monitoring systems can be traced to problems occurring in the sample handling systems.

Once the emissions sample is extracted from container 12, it is provided to analyzer 16 for quantitative analysis. Analyzer 16 can include any suitable sensors and measurement techniques in order to generally quantify the presence of oxygen, oxides of nitrogen, soot, volatile organic compounds, and other substances as desired. The output of analyzer 16 can be provided to a control system (which will be described in greater detail later in the specification) that makes decisions based upon the quantitative analysis and allows closed-loop control of the combustion process. For example, a parameter such as combustion air might be controlled based upon carbon monoxide content in the exhaust stream. In this manner, Continuous Emission Monitoring Systems are used to reduce emissions generated by sources by adjusting operating parameters to increase efficiency, or identify fault conditions which require repairs or system shut-down.

Figure 2:
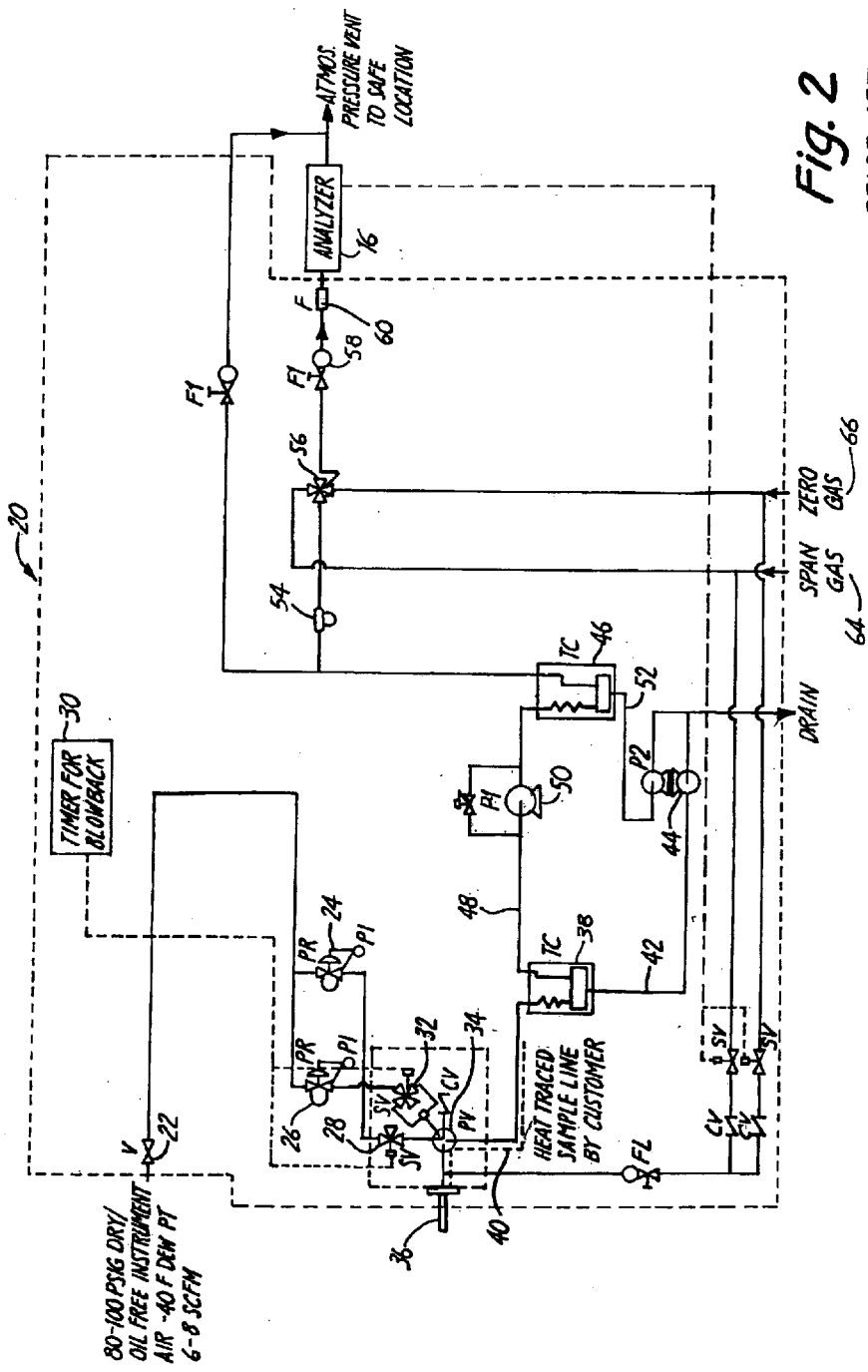
FIG. 2 is a diagrammatic view of a typical sample handling system.

FIG. 2 is a diagrammatic view of a prior art sample handling system generally used with Continuous Emission Monitoring Systems. Sample handling system 20 receives dry, oil-free instrument air at valve 22 which air is conveyed to pressure regulators 24 and 26. The regulated air from regulator 24 is provided to solenoid valve 28 which solenoid valve is controlled by energization signals from blow-back timer 30. The regulated output from pressure regulator 26 is provided to solenoid valve 32 which operates based upon an energization signal received from blow-back timer 30. The selectable air output from solenoid valve 32 operates four-way pneumatic valve 34 while the output from solenoid valve 28 provides blow-back through pneumatic four-way valve 34. Pneumatic four-way valve 34 is coupled to sample probe 36 which is adapted to couple to an emission source and receive a sample therefrom. The sample is conveyed through pneumatic four-way valve 34 to thermoelectric cooler 38 via a heated sample line 40.

Heated sample line 40 is maintained at a temperature of approximately 250° F. in order to inhibit condensation of the sample flow. Since this line is heated, it is relatively costly to provide and often costs in the range of $50.00 per foot. This cost, coupled with the fact that typical heated sample line is approximately 100 to 200 feet long in order to span the distance between the sample handling system and the analyzer, creates a significant cost for the sample handling system. Once the heated sample is conveyed to thermoelectric cooler 38, the sample is cooled and condensation is allowed to drain through line 42 which is assisted by peristaltic pump 44. The cooled sample is conveyed from thermoelectric cooler 38 to thermoelectric cooler 46 via line 48 and the assistance of sample pump 50. As with thermoelectric cooler 38, condensation from thermoelectric cooler 46 is drained via line 52 and the assistance of peristaltic pump 44. The doubly-cooled sample is provided from thermoelectric cooler 46 through filter 54, through selector valve 56, flow meter 58, and filter 60 to analyzer 16. Sources of span gas 64 and zero gas 66 are also provided to selector valve 56 as well as pneumatic four-way valve 34. These gases are used to provide known quantities to the analyzer to establish analyzer calibration. The complexity and costs of such a system make it not readily applicable to small scale operations such as for diesel generators.

Generally, system 20 includes two enclosures. The first enclosure is provided at the sample point on the stack or exhaust port and is generally sized to be approximately 24 inches high by 24 inches wide by 10 inches deep and is of standard design. This enclosure is generally heated to 250° F. plus or minus approximately 10° F. The first enclosure generally includes the sample probe, four-way valve which is air operated for blow-back and auto-calibration, as well as the solenoid valve. The second enclosure of system 20 is generally sized to be approximately 72 inches high by 24 inches high by 30 inches deep and is also generally of NEMA 4 design. The second enclosure generally includes both thermoelectric coolers, the peristaltic pumps for water drainage, the diaphragm pump for back pressure, the valves, filters, solenoid valves for auto-calibration with check valves, pressure regulators with pressure gauges for the four-way valve operation and for sample blow-back, and the flowmeter. Thus, it is apparent that the heated sample is conveyed from the first enclosure to the second enclosure and thus a suitable amount of heated sample line must be conveyed to span the distance between these two enclosures. This is a costly process since a typical span can range between 100 and 200 feet. At $50.00/foot, the tubing alone can cost between five and ten thousand dollars.

Figure 3:
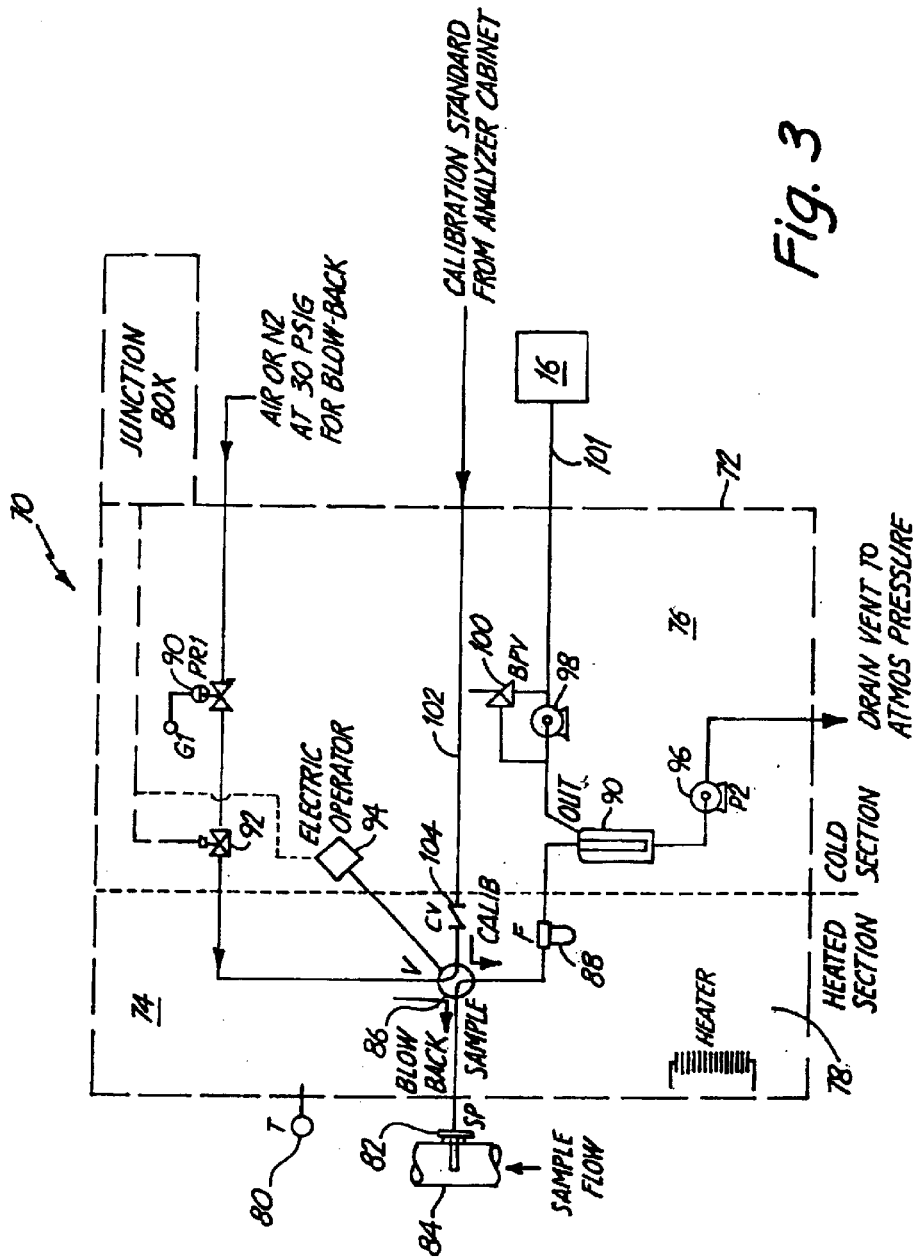
FIG. 3 is a diagrammatic view of a sample handling system in accordance with an embodiment of the present invention.

FIG. 3 is a diagrammatic view of an improved sample handling system 70 in accordance with an embodiment of the present invention. System 70 is provided within a single enclosure 72 which enclosure 72 is divided into portions 74 and 76. Preferably enclosure 72 is sized to be approximately 24 inches by 24 inches by 10 inches and of NEMA 4 design. Due to the size of enclosure 72, it can be mounted on top of an emissions stack. It is appreciated that enclosure 72 can be mounted on an exhaust port at a variety of locations. Portion 74 of enclosure 72 is maintained at an elevated temperature, such as 250° F., by heater element 78 operating in conjunction with feedback from temperature sensor 80. A suitable sample probe 82 is operably coupled to a source of emissions such as via pipe 84 and the sample is conveyed through four-way valve 86, through filter 88, to thermoelectric cooler 90. Four-way valve 86 is also coupled to a pressurized source of air or nitrogen for blow-back. Preferably, the pressurized source of air or nitrogen is provided at approximately 30 pounds per square inch gauge (PSIG). Although four-way valve 86 can be a conventional pneumatic four-way valve, it can also be a cost-effective chromatograph multi-position valve. The pressurized air/nitrogen is conveyed through pressure regulator 90 and solenoid valve 92, both of which are generally disposed within portion 76 of housing 72. As such, blow-back air can be selectively provided through four-way 86. Those skilled in the art will recognize since all components of system 70 are provided within a single enclosure 72, certain synergies can be achieved. Specifically, where previously four-way valve 86 was a pneumatic valve operated by pneumatic signals generated by multiple solenoids, a single electric operator 94 can be provided in portion 76 and mechanically coupled to valve 86. Generally, electrical devices such as electric operator 94 or solenoids cannot be provided within the heated portion 74 since the heat would degrade, if not destroy, the electrical components.

An emission sample from sample probe 82 is conveyed through heated section 74 of enclosure 72 through four-way valve 86, through filter 88, to thermoelectric cooler 90. Since thermoelectric cooler 90 is disposed relatively closely to heated portion 74, a heated line is not required for embodiments of the present invention. Specifically, unheated sample line such as one quarter inch diameter tubing can be used to convey the sample from valve 86 to thermoelectric cooler 90. Preferably, the sample tubing is formed of a chemically inert material such as polytetrafluoroethylene (PTFE) such as that available from E. I. du Pont de Nemours and Company, under the trade designation Teflon. The cost of such tubing is approximately $2.00 to $3.00 per foot. Preferably, this sample line runs from the probe enclosure to the analyzer enclosure which is generally a small 19 inch rack. Condensation from thermoelectric cooler 90 is drained with the assistance with peristaltic pump 96, and the sample is conveyed from thermoelectric cooler 90 to the analyzer with the assistance of sample pump 98 at a rate of preferably 2 to 3 liters per minute. A back pressure relief valve 100 is also provided to relieve excess back pressure.

System 70 can also receive a calibration standard through line 102 which is coupled to four-way valve 86. Preferably, system 70 includes check valve 104 interposed upon line 102 between the analyzer and four-way valve 86. Check valve 104 prevents contamination of the calibration line and the calibration cylinder.

The above-described sample handling system 70 can be easily installed or replaced in typically less than 20 minutes and is not a high maintenance item due to its simplified, efficient design. System 70 can require less than one hour to install, and complete start-up can generally be achieved in less than four hours. Typical sample handling systems such as that shown in FIG. 2 and described previously, generally require one week of installation and three to four days before start-up can be achieved. Moreover, system 70 can generally be designed to weigh less than 50 pounds thereby facilitating transportation. In contrast, conventional sample handling systems often weigh over 300 pounds, are bulky, large and require special transportation and special handling. Further still, conventional sample handling systems require both high pressure air and electrical power. In contrast, system 70, as described above, requires only electrical power and low pressure nitrogen or air for blow-back. As an illustration of the improved, simplified design of embodiments of the present invention, system 70 can be designed to cost approximately $2,700.00 where conventional sample handling systems typically cost in the neighborhood of $16,500.00.

Figure 4:
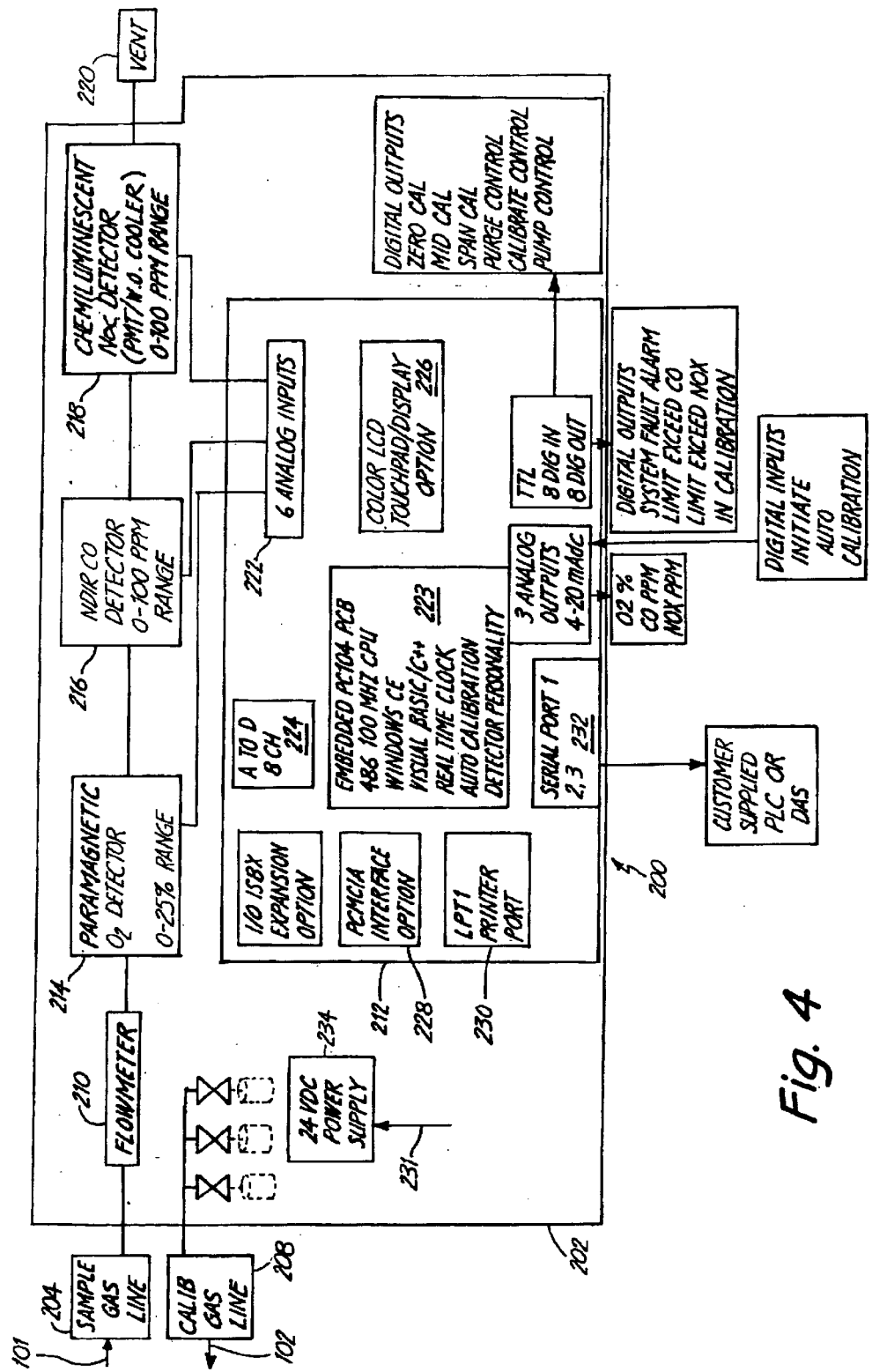
FIG. 4 is a diagrammatic view of an analyzer in accordance with an embodiment of the present invention.

FIG. 4 is a diagrammatic view of an analyzer in accordance with an embodiment of the present invention. Analyzer 200 can be used with sample handling system embodiments set forth above, such as in place of analyzer 16, or can be used with conventional sample handling systems. Analyzer 200 is generally provided within an enclosure 202 and receives sample gas through line 204 which is coupled to a sample handling system such as line 101 of sample handling system 70 (shown in FIG. 3).

Additionally, analyzer 200 includes calibration source gases 206 which can be selectively provided to a sample handling system, such as sample handling system 70 via line 208. Sample gas is received on line 204 and passes through flow meter 210 which provides a signal to Central Processing Unit (CPU) 212, which signal is related to sample gas flow passing through flowmeter 210. In one embodiment, after passing through flowmeter 210, sample gas passes through a paramagnetic oxygen detector which is specifically adapted to measure oxygen in the 0 to 20' range and provide a signal related to oxygen concentration to CPU 212. After passing through oxygen detector 214, sample gas passes through Non-Dispersive Infrared Detector 216 which provides a signal to CPU 212 that is related to carbon oxides in the 0 to 100 parts-per-million range. Finally, sample gas is conveyed to Chemiluminescent nitrogen oxide detector 218. Detector 218 provides a signal to CPU 212 based upon the quantitative presence of nitrogen oxide in the 0 to 100 parts-per-million range. After passing through detector 218, sample gas vents through vent 220.

In this embodiment, CPU 212 receives signals from flowmeter 210, paramagnetic oxygen detector 214, NDIR detector 216 and Chemiluminescent detector 218 at analog inputs 222. CPU 212 may also preferably receive numerous inputs from the engine as described later. Inputs 222 are coupled to a multi-channel analog-to-digital converter 224. Preferably A to D converter 224 has a relatively high resolution (20–24 bits or higher) and is used to improve signal-to-noise ratio of the underlying analytical measurements. The signal-to-noise ratio can be measured online and automatically optimized by adjusting digital filter parameters either at initial setup, during auto-calibration, or continuously online.

CPU 212 preferably includes an embedded control system such as a PC 104. In this particular embodiment, the PC includes a microprocessor operating at approximately 100 MHz. CPU 212, and all other components of analyzer 200, preferably receive electrical power via input 231. This power is conveyed to power supply 234 which typically reduces the voltage to a 24 volt DC power supply which provides 24 volts DC to the various components of analyzer 200. The embedded PC 104 system is commercially available. CPU 212 also preferably includes a display 226, such as a color LCD touch-pad display, a PCMCIA interface 228, and a printer port 230. Additionally, CPU 212 provides a number of outputs such as serial data output 232 which can provide serial data in any suitable form, such as RS232 to a customer supplied device such as a Programmable Logic Controller. (PLC) or Data Acquisition System (DAS).

Although one output of CPU 212 is described as serial data emanating from serial port 232, additional outputs can be provided such as, for example data in any suitable format conveyed over radio, wire, fiber-optic, or cellular phone communications. Such data can provide, for example, reports, alarms, generators/power system diagnostics, instrument diagnostics and analytical data as well as received control signals. The data can facilitate system self-diagnostics and remote monitoring. The computational power of CPU 212 allows the measurements provided by flowmeter 210 and detectors 214, 216 and 218 to be used to determine process and/or power system energy and/or plant efficiency and/or capacity as will be described in greater detail below. These quantities can be used to maximize efficiency by adjusting controls using gradient-based, search-based, or other optimization techniques. This data can also be used to adjust or control the engine or generator to thereby reduce or maintain emission levels at or below environmental restrictions or other constraints.

In one embodiment, CPU 212 preferably provides analog outputs in the 4 to 20 milliamp regime corresponding to oxygen percentage, carbon monoxide parts-per-million, and nitrogen oxide parts-per-million. Further still, CPU 212 can provide multiple TTL inputs and outputs. TTL inputs can be used to manually initiate auto-calibration. TTL outputs can provide signals that indicate system faults, carbon monoxide parts-per-million exceeding a selected threshold, nitrogen oxide exceeding a selected threshold, and a signal indicating that the system is in need of calibration. Further still, digital outputs relating to zero calibration, midpoint calibration, span calibration, purge control, calibration control and pump control can be provided as well.

Although the sample probe used for embodiments of the present invention can include conventional sample probes, sample probe 82 can be designed to use semi-permeable membranes to separate out particulates from exhaust gases to process gases to be analyzed. Additionally, a swept carrier gas can be provided proximate the semi-permeable membranes to thereby preclude direct sampling of the emission. This indirect sampling eliminates corrosion or condensation problems that result from some contact with process or exhaust gases.

Control and Operation

Figure 5:
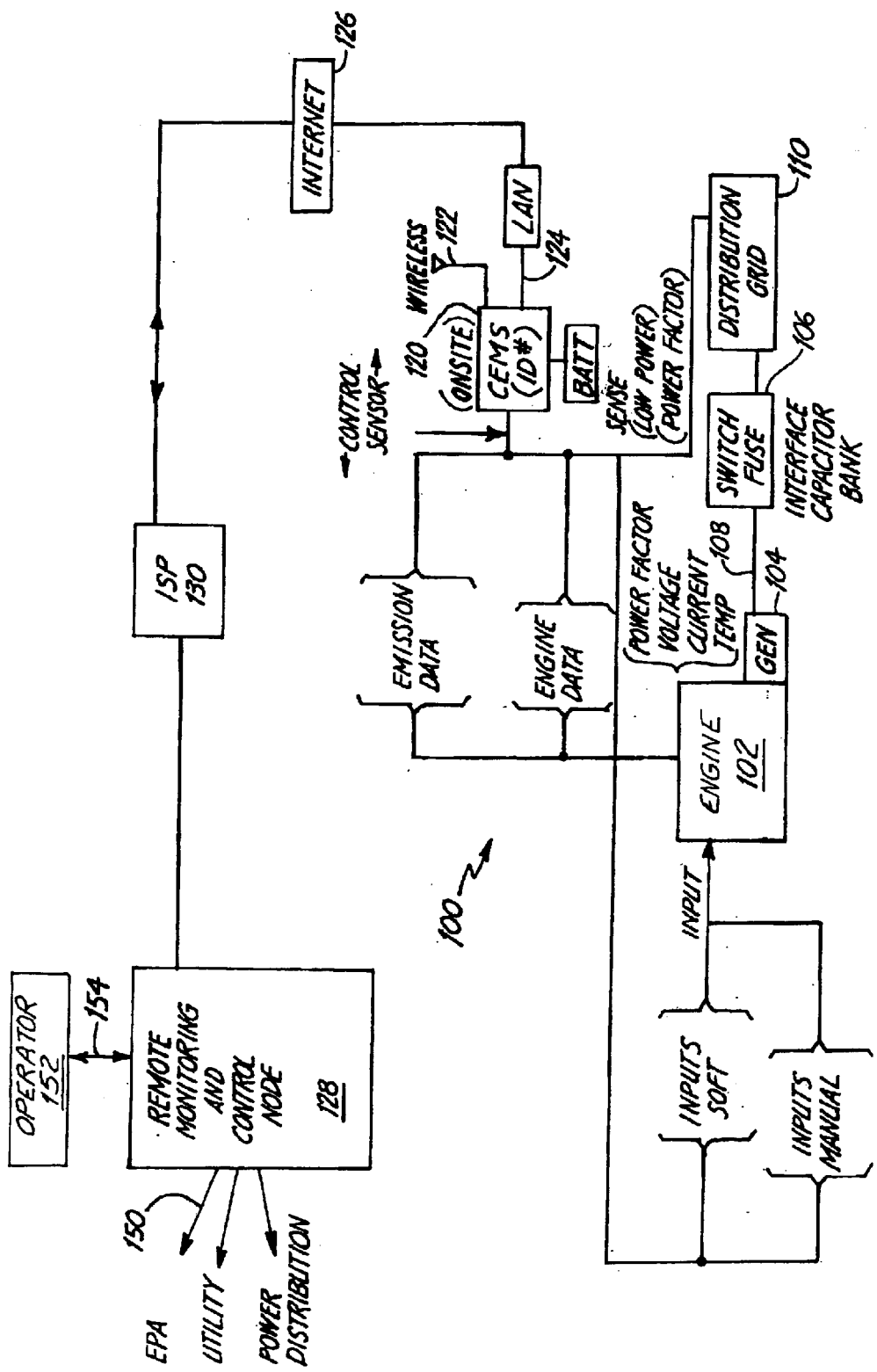
FIG. 5 is a diagrammatic view of a power generation system in accordance with an embodiment of the present invention.

FIG. 5 is a system block diagram of a system for generating electricity in accordance with an embodiment of the present invention. Powerplant 100 includes fossil fuel engine 102 coupled to generator 104 such that operation of engine 102 generates electricity which is provided to switch-fuse 106 on line 108. Switch-fuse 106 selectively provides electricity from generator 104 to distribution grid 110 and provides a fusible link between the generator and the distribution grid.

Fossil fuel engine 102 operates based upon a number of inputs including manual inputs and soft inputs. Examples of manual inputs include a start signal such as an operator pressing a start button, a start signal being provided by a remote operator, a shut-down signal, and a throttle signal. Examples of soft inputs include data about what physically is being provided to the engine such as the fuel level, fuel consumption rate, fuel composition, fuel filter, and the fuel-air mixture. As described above, emission control of engine 102 is of primary concern and thus an emission monitoring system 120 is preferably employed.

Emission monitoring system 120 is preferably located near engine 102 and is able to sample emissions from the exhaust stack or exhaust port and can sense emission characteristics such as oxides of nitrogen, oxides of carbon, and oxygen. Further, emission monitoring system 120 can also preferably monitor unburned fuel in the emission stream emission volume, emission heat, and even emission noise. Another parameter that can be monitored is the fuel composition itself. For example, diesel fuel is available in different mixes, and such mixes may require different engine operational characteristics. By determining fuel composition, system 120 can provide suitable outputs to the engine in order to ensure proper operation. Emission monitoring system 120 can also be provided with engine data such as engine RPM (revolutions per minute), hours remaining before engine 102 is due for overhaul, engine throttle position, engine oil pressure, engine temperature, and engine oil level. System 120 can also receive data on the electricity generated (low power factor power).

Preferably, monitoring system 120 employs predictive emission monitoring as set forth in U.S. Pat. No. 5,970,426, which patent is assigned to the Assignee of the present invention, and is incorporated herein by reference. Using combined predictive monitoring and measured emission monitoring provides enhanced accuracy and maintenance. However, using either method alone allows for an element of redundancy. Monitoring system 120 also preferably includes an interface to allow remote performance monitoring, control, and administration of multiple generators 100 as will be described in greater detail later in the Specification. As illustrated, emission monitoring system 120 includes a wireless interface 122 and local area network (LAN) interface 124. Those skilled in the art will appreciate that a number of options exist for communicating with remote locations, and all such options are expressly contemplated. One feature which facilitates remote operation and administration of such generators or powerplants is that at least one of interfaces 122 and 124 is coupled to a global computer network such as the Internet 126.

This arrangement allows remote monitoring and control node 128 to couple to engine 102 and generator 104 via an internet service provider 130. Preferably, node 128 includes suitable software to allow node 128 to function as an application service provider. An application service provider, as defined herein, is an entity, such as a business, that provides remote access to an application program across a network protocol. Moreover, node 128 can be designed to allow a user to simultaneously control, monitor, and calibrate simultaneous operation of a multitude of systems 100. More importantly, embodiments of the present invention allow automated reporting to the EPA on such generator emissions, as indicated by arrow. This significantly reduces administrative costs and facilitates cost effective power generation. Using the data provided to monitoring system 120, a remote operator 152 can interface with a generator or engine through node 128 in order to monitor and control a vast array of powerplant and power grid operational characteristics and system wide controls, as indicated by arrow 154. Such characteristics include, but are not limited to, fuel consumption, electrical loading of system 100, anticipating peak demand times, historical use of system 100, line stability in terms of voltage fluctuation, phase balance of the produced electricity, reflections present on the power grid, operational time restrictions, reporting parameters such as sending data automatically to system owners and/or federal regulators, system maintenance report generation, emergency shut-downs, initiation of auxiliary cooling, and load-flow calculations. Further still, node 128 can allow remote operator 152 to monitor characteristics of individual units such as unit fuel level, fuel capacity unit alarms, unit diagnostics, and other suitable parameters.

Remote operator 152 can also monitor an entire bank of systems 100 simultaneously. Such monitoring allows calculation of reserve power capacity of all generators both individually and in combination, calculation of profitability of operating individual units, the bank of units, or portions thereof, calculation of percent capacity of individual generators in use, power factor correction, and costs per kilowatt of produced electricity.

Remote operation and monitoring through node 128 also allows the user to activate individual systems 100 based upon external information such as the geographical location of each individual powerplant such that generation costs versus electrical transportation costs can be balanced. An example of this is if the operator knows that a specific region is undergoing peak demand for electricity, operation of generators in that general vicinity can be initiated first based upon all parameters to thereby reduce the cost of generating and transporting electricity to that region. By understanding operational costs such as fuel consumption and system maintenance cost, node 128 can facilitate a payment system to automatically receive or provide payments based upon the operation of one or more generators. Finally, a remote operator, or the node 128, can request fuel delivery to the powerplant either manually or automatically and specify quantity and/or quality of fuel to be delivered to each and every system 100 via electronic communication. Node 128 or an individual can also generate requests for scheduled maintenance upon individual powerplants via the Internet.

Distributed Monitoring and Control

Figure 6:
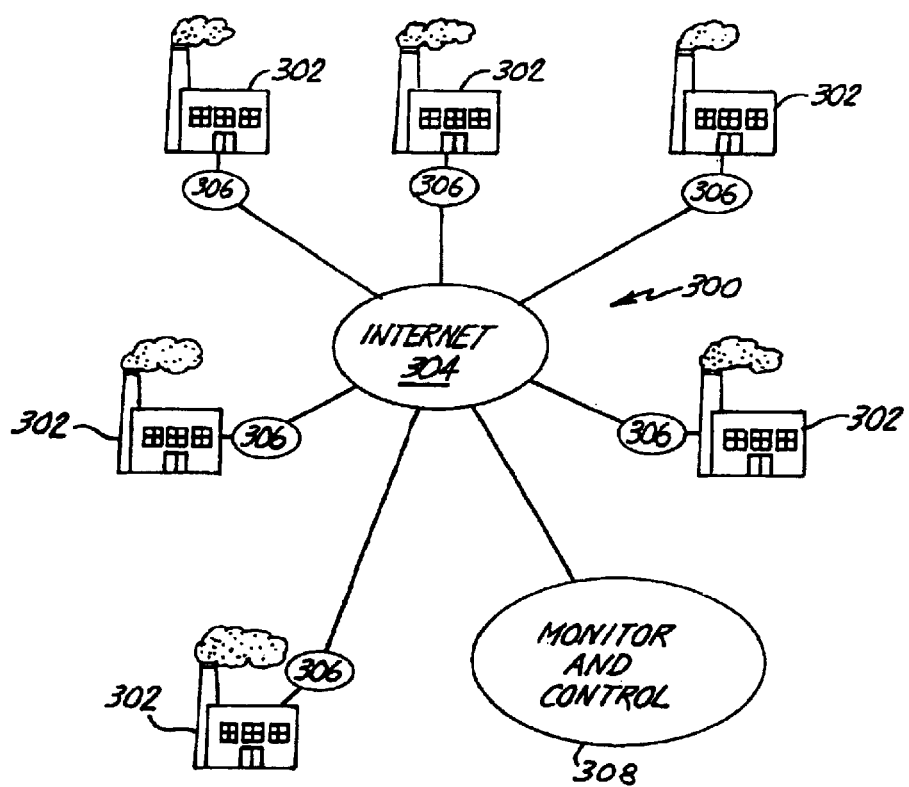
FIG. 6 is a diagrammatic view of a system for monitoring and controlling multiple power generating systems in accordance with an embodiment of the present invention.

FIG. 6 is a system block diagram of a generating system in accordance with an embodiment of the present invention. System 300 includes generators 302, each of which is coupled to the Internet 304 via local controllers 306. Although each of generators 302 is illustrated diagrammatically as a small power plant, in reality such generators can take any form including, electrical generators coupled to such primary power sources as reciprocating diesel engines, reciprocating gas engines, gas turbines, steam turbines, package boilers and waste heat boilers. Further, generator 302 can also take the form of solar-based generators, wind-based generators, fuel-cell based generators, or any other suitable device that is capable of transforming any form of potential energy into electricity. Preferably, local controllers 306 take the form of CPU 212 described above. Thus, controllers 306 are each adapted to provide local monitoring and control intelligence for its associated generator. Each of local controllers 306 is also preferably adapted to sense the phase of the power grid to which the generator is attached and control the generator such that the phase of the generated electricity matches that of the grid. As illustrated in FIG. 6, each of local controllers 306 is coupled to monitor and control node 308 via internet 304. Local controllers 306 can take the form of CPU 212 described above. This is simply a preferred arrangement since it allows a virtually infinite number of control nodes 308 to be coupled to generators 302 at virtually any location in the world. However, in embodiments where control node 308 is located suitably close to generators 302, various other communications can be used. For example, generators 302 can be coupled to monitor and control node 308 via wireless, wired, or fiber optic communications. Regardless of the manner in which local controllers 306 are coupled to control node 308, the arrangement provides for the abilities to remotely start, run and dispatch generated power to the grid from nodes 308. Generators 302 preferably include suitable detection devices such as temperature, pressure, differential pressure, mass flow and analytical detection devices to determine such quantities as composition, heating value and cost of fuel, for example. Additionally, by also measuring power output, power generation unit costs and thermal efficiency can be calculated provided to the user.

Using the improved dispatch, control, and monitoring system in accordance with embodiments of the present invention facilitates high-level emission monitoring and control. For example, the data from individual generators 302 can be provided to a centralized controller such as node 308 that can be adapted to perform area monitoring and provide data to allocate the deployment, operating level, and other appropriate parameters to reduce aggregate or maximum area pollution levels or to maximize power production within an allowable area (e.g. the bubble concept) pollution levels (maximum or area aggregate average). Further still, Light Detection And Ranging (LIDAR) scanning environmental quality monitoring equipment and/or multiple stationary environmental monitoring stations (not shown) can take emissions data into a local or remote environmental quality measurement, mapping, management, control and optimization system. This data can be used to automatically control and select the generators that are on-line. This ensures that only those generators that would not cause the environment to exceed established limits are operated. Alternatively, individual units could be controlled and/or selected such that the mix of generation and operating point for each resource is optimized to minimize aggregate environmental pollution.

Information about the combustion process in fossil-fuel based generators can also be conveyed via the Internet and calculations can be stored and performed by an Internet server or other suitable service. Further, the various devices to which CPU 212 can be coupled either directly or via a global computer network can assist in the optimization process and thereby provide communications related to optimization via an internet application service provider server. The sophistication of analyzer 200 allows the entire system, including the engine to be remotely monitored and/or controlled either from a control room or even from an electrical grid in response to central energy management controls.

Although communication node 304 is illustrated as the Internet, any suitable medium can be used to couple the local controllers 306 to monitor and control node 308. The Internet is preferred because it allows a virtually infinite number of control nodes 30B to be coupled to generators 302 at virtually any location in the world. However, communication node 304 can take a variety of forms such as internet, intranet, virtual LAN, etc.

For embodiments where the primary power source for a generator is based upon fossil-fuel combustion, it is preferred that the generator include a continuous emission monitoring system such as that disclosed above. Further still, it is preferred that emissions calculations for such continuous emission systems be shared among local controllers 306 or even control nodes 308. Those skilled in the art will recognize that the distributed control and monitoring system illustrated in FIG. 6 facilitates acquisition of local sensor data, such as unprocessed emissions sensors and communication to additional devices such as other controllers 306 or control node(s) 308 such that a shared computing resource is used to calculate generation parameters. Control node 308 can also include an application service provider as discussed above. These calculations can be used to optimize an individual generator 302 while minimizing or at least reducing its emissions. Emissions can be automatically reported to suitable authorities via the internet or other communication methods and operating data can be monitored globally via these same communication methods.

It is appreciated that the above-described system can be used to facilitate various optimizations in generator operation. For example, embedded model-based optimization of the generating equipment can be used to minimize pollutants such as oxide nitrogen and carbon as well as maximize generating efficiency by adjusting generating equipment parameters. Such parameters include, but are certainly not limited to, excess air, operating temperature, and timing, depending on the nature of the generating equipment. As described above, various processes and techniques can be used to relate individual, or combinations of sensor information for minimization of emissions or optimization of generator efficiency. Such maximization of generator efficiency can be done using vector gradient or other techniques known in the art. This optimization can optionally run on local microprocessor(s) (such as the embedded PC's described above) and provide redundancies. Alternately, the optimization can be executed remotely by a server over a global network, such as the internet. The internet can also be used a back-up means for both optimization and control should the local capability be unavailable for any reason.

Further, on-site measurement or monitoring of key generating equipment, analytical sensors or controllers (including self-diagnosis by the equipment) can determine and report operating health of the generating equipment, sensors or controllers and conceivably even predict time to failure. Such measurements and predictions can be provided to suitable personnel to automatically dispatch such persons as well as provide data regarding parts, equipment, and other resources needed to perform the anticipated maintenance. Further, the system can provide a fail-soft capability such that when aberrant operation is detected, the controls (either local or remote) can be used to initiate particular operating modes of the generator, which modes will prolong the generator life until it can be serviced.

Alternatively, the control and optimization could be executed via a shared remote server at the dispatch site or elsewhere. Another alternative is to utilize a remote application server provider (ASP) to execute the control and optimization and CEMS calculations, and reporting, monitoring (alarms, operator guides, etc.) and to deliver such control, optimization and monitoring information via the internet, virtual LAN, or other communication means.

Although embodiments have been described with respect to specific process variables being used for generator optimization, it is expressly contemplated that any number of variables including, but not limited to, carbon monoxide levels, nitrogen oxide levels, sulfurous oxide levels and oxygen could be used to facilitate any or all of the following: emission compliance, combustion optimization, power output maximization, emission control through power source optimization, emission control by addition of suitable agents such as nitrogen oxides, adsorbents of sulfurous oxides, steam or water. Any suitable variables for each generator can also be adjusted for any of the above purposes. For example, the fuel feed rate, timing, air/fuel ratio, temperature, and amount of steam injection could be varied to provide the above advantages.

Efficiency

The economics of large-scale implementation of micro power generators and controllers would be improved if the efficiency of such systems could be enhanced. Pursuant to another aspect of this invention, the waste heat flowing from the powerplant itself could be put to additional use. For example, many of the facilities listed above with excess generating capacity, also employ air conditioning systems, especially in locations with warmer climates. A relatively recent innovation in air conditioning systems is the hydride heat pump. An example of a hydride heat pump system is set forth in U.S. Pat. No. 5,497,630. A hydride heat pump system is an alternative to traditional vapor compression and absorption refrigeration systems. One of the primary advantages of hydride heat pump systems is that they do not use refrigerants such as ozone-depleting chloro-fluoro-carbon refrigerants (CFC's). In hydride heat pump systems, a low temperature metal hydride (a refrigerant hydride) is coupled to a high temperature hydride (the regenerator hydride) permitting energy to be extracted from the refrigerated space. The energy absorbed at low temperature during the refrigeration step dissociates hydrogen from the refrigerant hydride where it flows into the regenerator hydride, which is at a lower pressure. The hydride heat pump system does not include any moving parts and operates using virtually any heat source.

Figure 7:
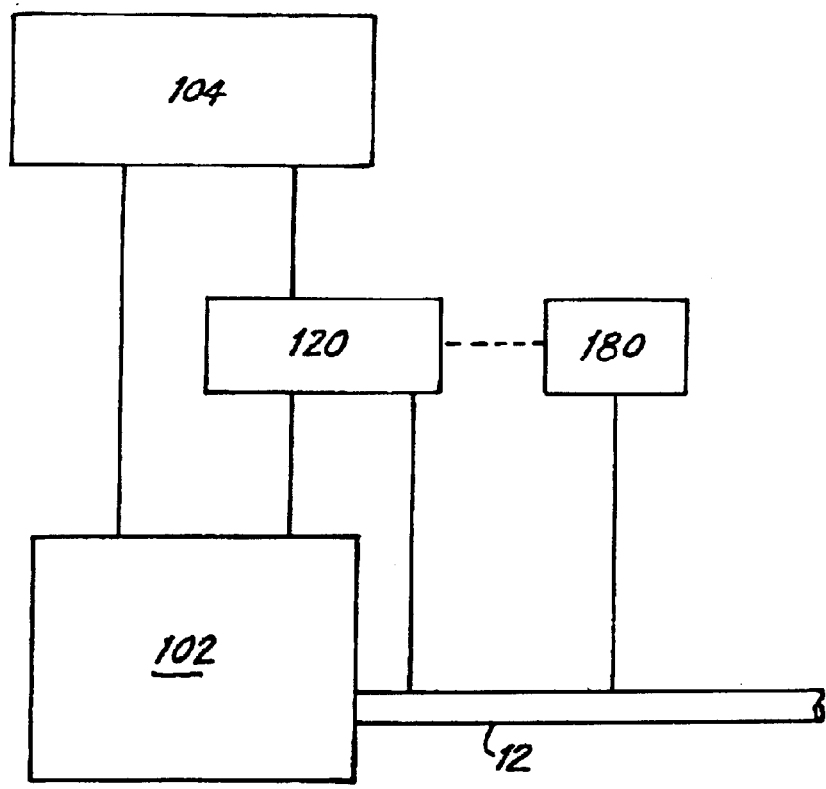
FIG. 7 is a diagrammatic view of a power generating system and heat pump system operating in accordance with an embodiment of the invention.

FIG. 7 is a diagrammatic view of a power generating system and heat pump system operating in accordance with an embodiment of the invention. Engine 102 is coupled to generator 104 as described previously with respect to FIG. 5. CEMS 120 is coupled to both engine 102 and generator 104 in accordance with embodiments of the invention described above. Unlike previous embodiments, however, FIG. 7 illustrates metal hydride heat pump system 180 thermally coupled to stack or exhaust port 12. Embodiments of the invention described herein essentially thermally couple the waste heat from the electricity generating source (engine 102) to hydride heat pump system 180 to take further advantage of energy otherwise lost during power generation.

One of the synergies created by the combination of the metal hydride heat pump system 180 and continuous emission monitoring system 120 described above is that changes and/or deteriorations in the internal chemistry, or other parameters of interest, within the metal hydride heat pump system can be detected and/or controlled. This optional feature is illustrated as dashed line 182 in FIG. 7. CEMS 120 employs a number of relatively sophisticated sensors, and can easily be scaled to include additional sensors that sense parameters of interest within metal hydride heat pump system 180. Moreover, since the heat source for the metal hydride heat pump system is the waste stream itself flowing through stack or exhaust port 12, it is possible to remove particular components from a combustion waste stream to thereby continually, or periodically, regenerate the internal chemistry within the metal hydride heat pump 180. Thus, maintenance of the metal hydride heat pump 180 could be reduced and the longevity thereof could be increased.

Although the invention has been described with reference to preferred embodiments, workers skilled in the art will recognize that changes can be made in form and detail without departing from the spirit and scope of the invention.

What is claimed is:

1. A Continuous Emission Monitoring System for fossil fuel based generators, the system comprising:

an analyzer adapted to receive a sample flow and provide an output indicative of at least one constituent of the sample flow;

a sample handling system coupleable to an emission source and adapted to extract an emission sample from the sample source and provide the extracted emission sample to the sample analyzer; and wherein the sample handling system is embodied within a single enclosure disposed externally to the emission source, wherein the single enclosure has two compartments which are maintained at different temperatures with respect to one another.

2. The system of claim 1, wherein the first compartment includes a sample probe and valve, and wherein the first compartment is maintained at an elevated temperature, and wherein the second compartment includes a thermoelectric cooler.

3. The system of claim 2, wherein non-heated tubing connects the valve to the thermoelectric cooler.

4. The system of claim 1 wherein polytetrafluoroethylene tubing conveys a sample from a sample probe to the analyzer.

* * * * *